Feb. 17, 1931. H. BURMEISTER 1,792,810
APPARATUS FOR PRODUCING FIRE EXTINGUISHING FOAM
Filed Nov. 12, 1927
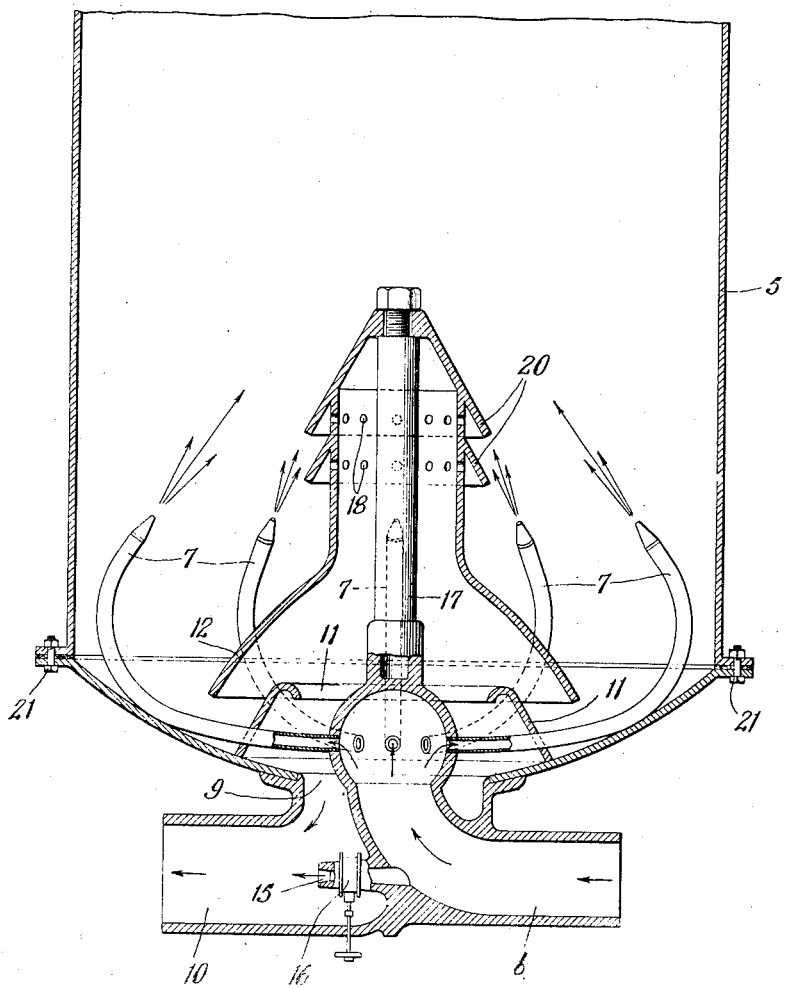
INVENTOR
HANS BURMEISTER
BY Maxwell Barns
ATTORNEY Patented Feb. 17, 1931

1,792,810

UNITED STATES PATENT OFFICE

HANS BURMEISTER, OF BERLIN, GERMANY, ASSIGNOR TO PYRENE-MINIMAX CORPORATION, A CORPORATION OF DELAWARE

APPARATUS FOR PRODUCING FIRE-EXTINGUISHING FOAM

Application filed November 12, 1927, Serial No. 232,783, and in Germany April 27, 1927.

The present invention relates to apparatus for producing foam for fire extinguishing purposes and has for an object to provide improved means for combining powder and water to form foam.

The nature and objects of the invention will be better understood from a description of a particular embodiment thereof, for the purposes of which description reference should be had to the accompanying drawing forming a part hereof and in which—

The figure is a central sectional view of a foam generator constructed in accordance with the principles of the invention.

In the apparatus shown for the purposes of illustration a container 5 is adapted to receive a charge of foam forming chemicals. Water is supplied through an inlet 6 terminating in a plurality of similar nozzles 7 which are directed inwardly and upwardly to project streams of water into the charge of foam forming chemicals. The inlet member 6 is surrounded by an annular opening 9 leading into the foam outlet 10. Surrounding the outlet is an upstanding baffle plate 11 which cooperates with a bell-shaped deflector member 12 to provide a tortuous passage for the foam as it flows from the generator chamber to the outlet 10. The material flowing between the upstanding deflector member 11 and the upper deflector member 12 to the outlet may contain an insufficient proportion of water and it is desirable to provide means for adding water thereto for which purpose a nozzle 15 leads from the inlet passage 6 to the outlet passage 10 and, preferably, is directed longitudinally of the latter to act more or less as an ejector element to increase the flow of foam in the outlet passage. If desired, a valve may be provided for controlling the flow through the nozzle 15 as indicated at 16.

The bell member 12 is carried by an upstanding support 17 projecting from the casting in which are formed the inlet and outlet conduits. This bell member may desirably be provided with apertures 18 to permit foam formed in the adjacent portion of the chamber to flow into said bell member and through it to the outlet 10. The apertures 18 are, preferably, positioned beneath baffle plates 20, as shown.

It will be noted that in the arrangement shown the water inlet and foam outlet connections are all made through the bottom member of the generator. The side wall member and the bottom member are separably connected as by means of bolts 21 and the side wall member can be readily removed for the purpose of cleaning the device without disturbing the inlet and outlet connections, all of which are made through the bottom member.

The foregoing description of a particular embodiment is illustrative merely and is not intended as defining the limits of the invention.

I claim:

1. Apparatus for producing foam for fire extinguishing purposes comprising a generator providing a chamber for foam forming powder, an inlet having a plurality of nozzles connected thereto for delivering water into the bottom portion of said chamber, a foam outlet adjacent the bottom of said chamber and baffle means about said outlet providing a tortuous passageway from within said chamber to said outlet.

2. Apparatus for producing foam for fire extinguishing purposes comprising a generator providing a chamber for foam forming powder, an inlet nozzle for delivering a stream of water into the lower portion of said chamber, an outlet in the bottom of said chamber, an upstanding baffle plate surrounding said outlet, a bell-shaped deflector member above and surrounding said baffle plate to provide a tortuous passage from said chamber to said outlet.

3. Apparatus as defined in the preceding claim wherein the deflector member is provided with inlet openings toward the top thereof communicating with the outlet.

4. Apparatus for producing foam for fire extinguishing purposes comprising a generator providing a chamber for foam forming powder, an inlet terminating in a nozzle directed upwardly for delivering water into a charge of powder in said chamber, an outlet for foam leading from the bottom of said chamber and a nozzle connected with said inlet and directed into said outlet and longitudinally thereof.

5. Apparatus for producing foam for fire extinguishing purposes comprising a generator providing a chamber for foam forming powder, an inlet terminating in a nozzle for delivering water into a charge of powder in said chamber, an outlet for foam in substantially direct communication with the bottom of said chamber and a baffle between the nozzle and outlet to provide a tortuous passage therebetween.

6. In apparatus for producing fire extinguishing foam a container for foam forming chemicals, an inlet for water passing through the bottom of said container, a foam outlet concentric with said inlet, and means for preventing direct discharge of water from said inlet into said outlet within said container.

7. In apparatus for producing fire extinguishing foam a container for foam forming chemicals, an inlet for water passing through the bottom of said container, a plurality of nozzles connected with said inlet and adapted to distribute the water within said container, a foam outlet surrounding said inlet, and means for preventing direct discharge of water from said inlet into said outlet within said container.

8. In apparatus for producing fire extinguishing foam a container for foam forming chemicals, an inlet for water passing through the bottom of said container, a foam outlet adapted to convey foam substantially directly from the bottom of said container, means for preventing direct discharge of water from said inlet into said outlet within said container, and means providing direct communication between said inlet and outlet outside of said container.

HANS BURMEISTER.